United States Patent [19]
Gugel

[11] Patent Number: 4,746,232
[45] Date of Patent: May 24, 1988

[54] LOW FRICTION CROSS ROLLER BEARING

[76] Inventor: Georg Gugel, D-8552 Höchstadt, Fed. Rep. of Germany

[21] Appl. No.: 928,438

[22] Filed: Nov. 7, 1986

[30] Foreign Application Priority Data

Nov. 11, 1985 [DE] Fed. Rep. of Germany ... 8532126[U]

[51] Int. Cl.$^4$ .................... F16C 19/30; F16C 19/50; F16C 33/58
[52] U.S. Cl. .................... 384/619; 384/447; 384/569; 384/622
[58] Field of Search ............ 384/619, 447, 47, 569, 384/625, 575, 551, 620, 584, 511, 622

[56] References Cited

U.S. PATENT DOCUMENTS

| | | | |
|---|---|---|---|
| 3,517,975 | 6/1970 | Lonngren et al. | 384/619 |
| 4,015,884 | 4/1977 | Bertram et al. | 384/569 X |
| 4,479,683 | 10/1984 | Kanamaru | 384/619 |
| 4,606,654 | 8/1988 | Yatsu et al. | 384/619 X |

FOREIGN PATENT DOCUMENTS

| | | | |
|---|---|---|---|
| 1930615 | 4/1965 | Fed. Rep. of Germany . | |
| 3006643 | 9/1981 | Fed. Rep. of Germany . | |
| 3120265 | 12/1985 | Fed. Rep. of Germany . | |
| 1229564 | 9/1960 | France | 384/447 |
| 2071234 | 9/1971 | France | 384/619 |
| 0057196 | 7/1924 | Sweden | 384/619 |
| 0706893 | 4/1954 | United Kingdom . | |

*Primary Examiner*—Stuart S. Levy
*Assistant Examiner*—Steven M. Dubois
*Attorney, Agent, or Firm*—Jordan and Hamburg

[57] ABSTRACT

A bearing in which the cylindrical roll bodies, which follow one another in the circumferential directions, are mutually displaced by a particular crossing angle and, moreover, deviate from the previously normal crossing angle, by about 100 to 130 degrees and preferably by 110 degrees.

16 Claims, 5 Drawing Sheets

LOW FRICTION CROSS ROLLER BEARING

The invention relates to a bearing.

Basically, such a bearing is already known from the British Pat. No. 706,893. Bearings are provided there, which may also be cylindrical. The roll bodies are guided by ribs, which are provided in the V-shaped recesses and which engage corresponding grooves of the roll bodies. From a production engineering point of view, however, this arrangement requires a relatively large expenditure of work.

It is, moreover, known from the German Utility Pat. No. 1,930,615, that the bearing surfaces of the roll bodies may be run on steel inserts, so-called steel tires, which may be exchanged as required.

If no particular accuracy requirements are set, four-point bearing may be used. This bearing design does not make great demands on the surface eveness and stiffness of the connecting constructions. Axial play and radial play are adapted to the intended purpose and generally are relatively large. Four-point bearings are suitable for absorbing average axial, radial and moment loads. The permissible peripheral velocity at maximum load 4 m/s, but may also be higher for brief periods.

For average axial and moment loads and high radial forces, the cross roller bearing is used, especially when a working clearance tending towards zero or an initial stress or a particularly uniform restraining torque and running accuracy are required. The requirements, placed on the connecting constructions with respect to surface eveness and stiffness, are higher than in the case of four-point bearings. The permissible peripheral speed at maximum load is only 2 m/s, but can also briefly be higher with this bearing.

From the German Offenlegungsschrift No. 3,120,265, a cross roller bearing is known, in which consecutive roll bodies form an angle of 90 degrees. The supporting rings have V-shaped grooves, in which the roll bodies are guided by means of their circumferential surfaces and also their front surfaces or transition radii. A segmented retainer is provided to ensure reliable spacing between the individual roll bodies. As can be seen particularly from FIG. 1 there, the transition radii or front faces at the inner raceway of the roll bodies lie against the surfaces of the V-shaped grooves. Frictional moments therefore develop at the transition radii or front surfaces of the roll bodies during the rolling processes. These frictional moments lessen the smooth running of the bearing, increase wear and adversely affect the quiet running of the bearing.

From the German Offenlegungsschrift No. 3,006,643, a so-called wire rolling bearing is known which also comprises two concentric supporting rings, which are provided at their mutually facing cylindrical surfaces with approximately V-shaped grooves, in the area of contact of which, however, recesses with inserted track wires of approximately semicircular cross section are provided, on which the cylindrical roll bodies roll. Here also, the axes of consecutive roll bodies are disposed at an angle of 90 degrees to one another.

It is therefore an object of the invention to provide a bearing, which is smooth running and moreover less expensive to manufacture.

Advantageous further developments arise out of the dependent claims.

The invention is described in the following by way of example by means of the drawings.

DESCRIPTION OF THE PREFERRED EMBODIMENT

Figure 1:
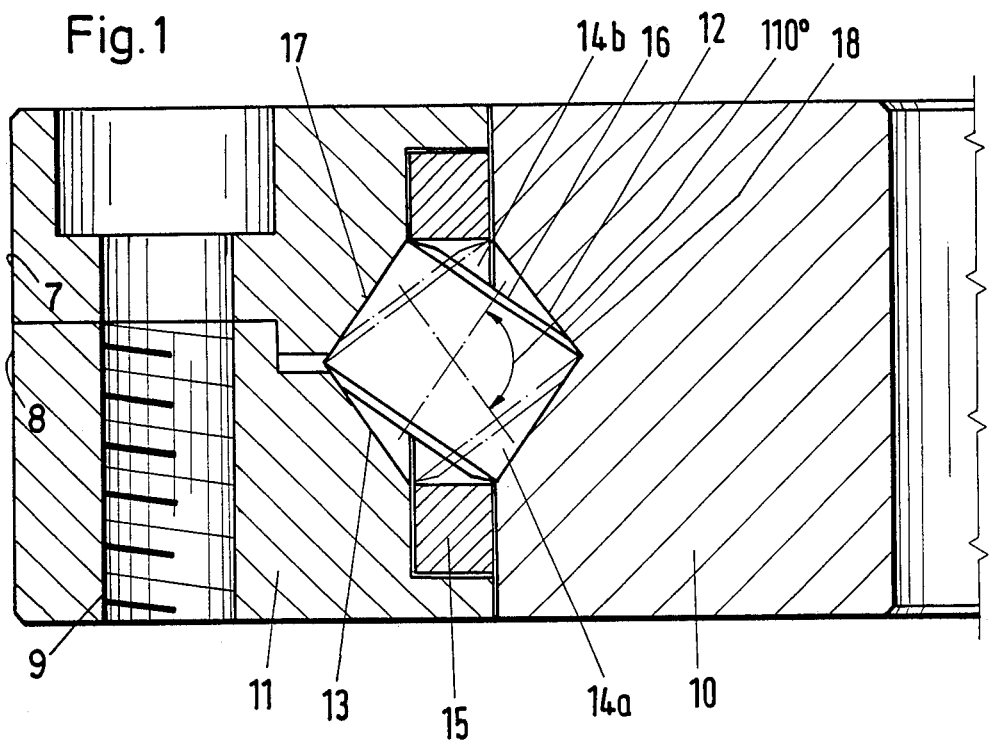
FIG. 1 shows a cross roller bearing comprising an inner and an outer supporting ring, in which the axes of consecutive roll bodies form an angle of about 110 degrees.
Figure 6:
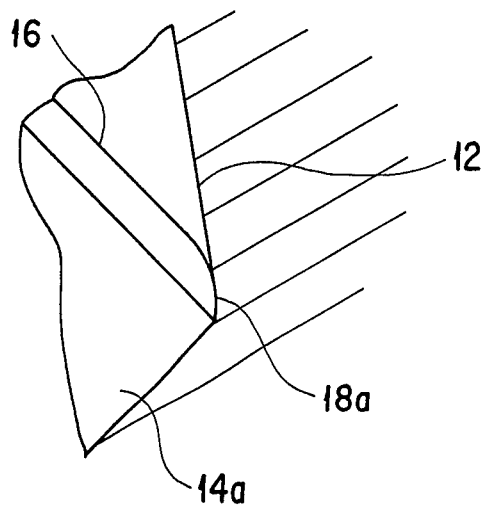
FIG. 6 is a partial view showing an alternate embodiment.

In FIG. 1, a cross roller bearing is shown, which comprises an inner supporting ring 10 and an outer supporting ring 11, the facing circumferential surfaces of the supporting rings 10 and 11 having essentially V-shaped grooves 12 and 13 respectively. Roll bodies 14a and 14b are disposed in these grooves, consecutive roll bodies 14a and 14b being mutually offset by an angle (angle between axes) of about 100 to 130 degrees and preferably by an angle of 110 degrees. Consecutive roll bodies 14a and 14b are kept at the desired distance from one another and moreover prevented from twisting by a retainer 15. At the transition from a front surface 16 of a roll body 14a, 14b to a circumferential surface 17, a narrow bevel 18 may be provided, the angle between which and the circumferential surface 17 corresponds to the angle of the V-shaped groove 12 or 13. Instead of the bevel 18, a peripheral radius of curvature, for example as shown at 18a in FIG. 6, may also be provided as transition from the circumferential surface 17 to the front surface 16.

With the above-described construction of the V-shaped grooves 12 and 13, as well as of the roll bodies 14a, 14b, frictional forces arise which, contrary to the previously known cross roller bearings with 90 degree grooves, are no longer distributed over practically the whole of the front surface 16, but occur only between the V-shaped groove and the relative narrow bevel 18 or the radius of curvature. Because of the low lever arm effect in relation to the respective roll-off point, the frictional moments, so formed, are very slight and can be disregarded in comparison to the moments, which occured in the hitherto known cross roller bearings at their roll body front surfaces.

The above-described bearing exhibits considerably less wear and considerably less bearing friction. The hanging, which frequently occurs with the known bearings, especially when starting up and when the axis of rotation is in a horizontal position and which can be attributed to tilting of the rolls, is avoided with the bearing described above. The following are mentioned as particular advantages of the bearing: high, reliable rotational speeds (peripheral speeds up to about 15 m/s), low-noise running, low and uniform restraining torque, uniform running (no hanging), good dynamic load-bearing capacity and problem-free use even in bearings with initial tension.

To make it easier to fill in the roll bodies, at least one of the supporting rings 10, 11, as is basically already known, may have a split construction or be provided, as is also already known, with a filler port. For example, the support ring 11 may consist of the two parts 7 and 8 secured together by bolts 9 as shown in FIG. 1.

Figure 7:
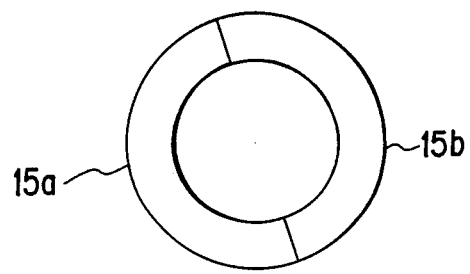
FIG. 7 is an elevational view, on a smaller scale, of a segmented retainer.
Figure 8:
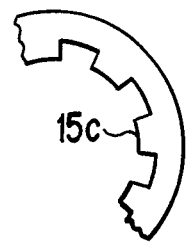
FIG. 8 is a partial view, on a smaller scale, of a retainer with a comb-like form.

For mutually spacing the roll bodies and to prevent them from twisting and tilting, a retainer 15 may be provided, which may be constructed in one piece on in a segmented form as shown at 15a, 15b in FIG. 7. Also the retainer 15 may be of a comb-like form as shown at 15c in FIG. 8.

Figure 2:
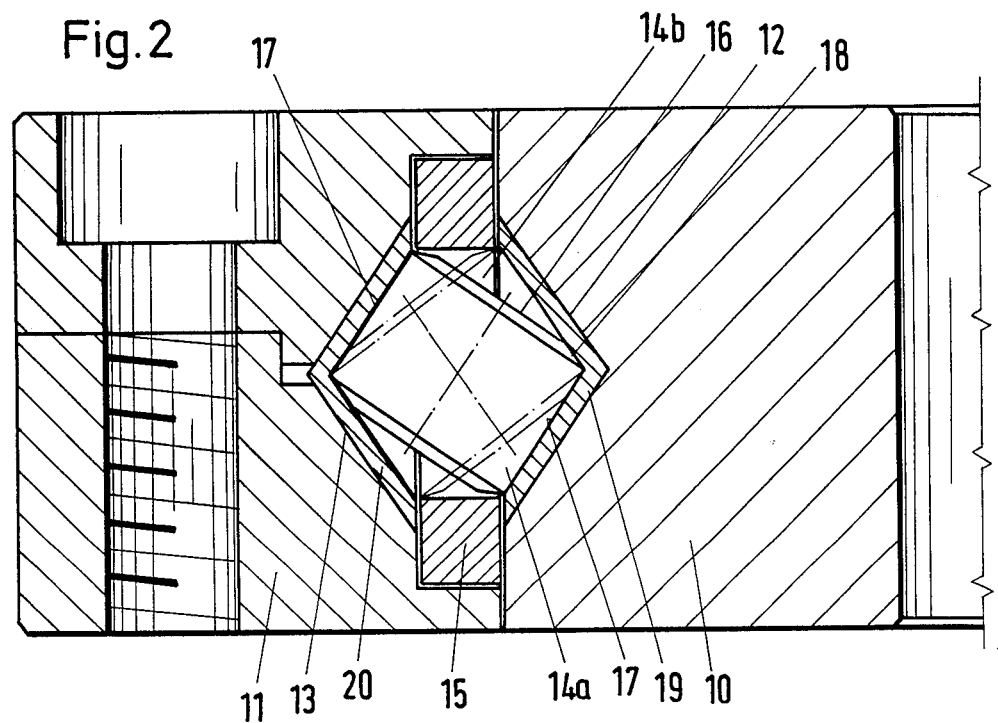
FIG. 2 shows a bearing similar to that of FIG. 1, in which the V-shaped grooves are provided with additional inserts, preferably of hardened steel.

The V-shaped grooves 12 and 13 of the supporting rings 10 and 11 may be provided with insert 19 and 20, as shown in FIG. 2, said insert being divided at its periphery. Should wear occur, the inserts 19 and 20 respectively could be exchanged, while the bearing per se, however, is used further. Such inserts 19, 20 can also be produced from a particularly high-grade material without the bearing as a whole being made appreciably more expensive.

Figure 3:
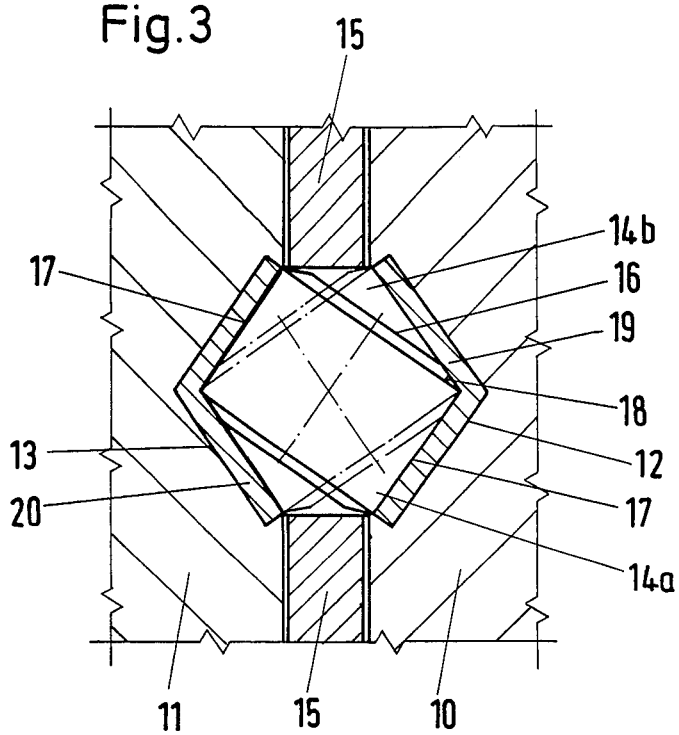
FIG. 3 shows a bearing similar to that of FIG. 2, in which, however, the supporting rings have pronounced shoulders for holding the inserts.
Figure 4:
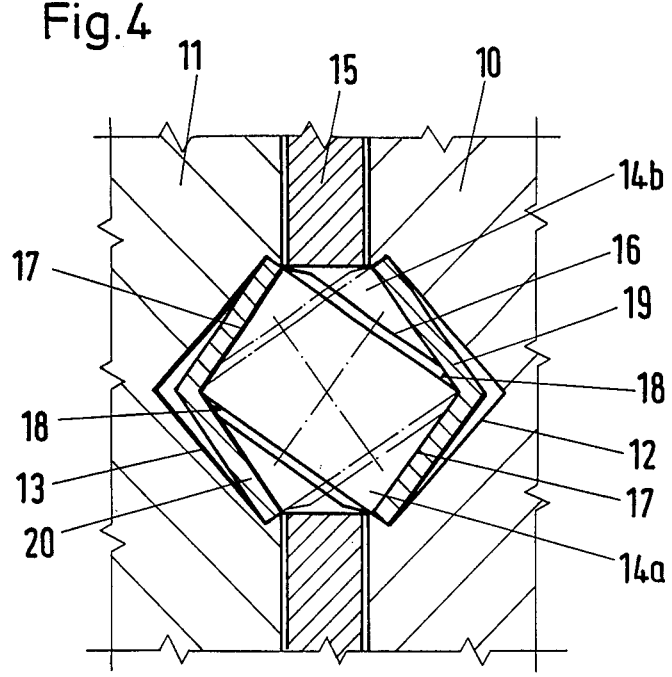
FIG. 4 shows a bearing similar to that of FIG. 3, in which the apex angle in the supporting ring is slightly smaller than that of the insert.

Moreover, inserts 19 and 20 and supporting rings 10 and 11 can also be constructed as shown in FIGS. 3 and 4. The inserts 19 and 20 are forced into the appropriate seats on the supporting rings 10 and 11 by slightly deforming them elastically.

If now the apex angle of the supporting rings 10 and 11 is dimensioned somewhat smaller than that of the V-shaped inserts 19, 20, the appropriate diameters being taken into consideration, a spring-pretensioned bearing is obtained, as shown in FIG. 4. This construction is particularly advantageous for intermittent, vibration-prone and high-speed operations.

The different bearings described above can assume primarily the function of a cross roller bearing. When using balls as roll bodies in conjunction with the V-shaped profiles 19 and 20, an installation unit with four-point support results, which also has special advantages with respect to manufacture and the adjustment of play in the case of a divided supporting ring.

Figure 5:
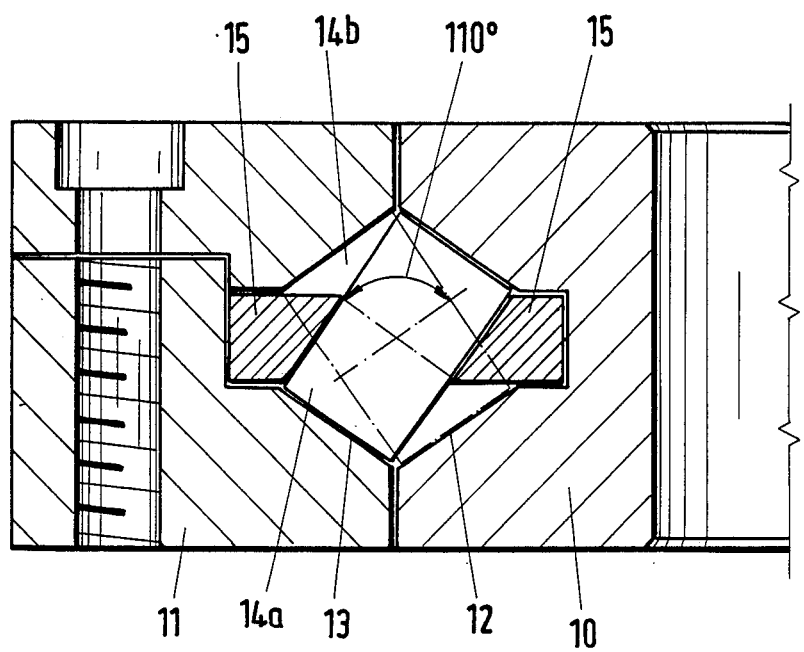
FIG. 5 shows a modified arrangement with the retainer and roll bodies turned by 90 degrees relative to the arrangement shown in FIG. 1.

FIG. 5 shows a bearing, which is slightly modified from that shown in FIG. 1 and in which the retainer and roll bodies are averted by 90 degrees relative to the representation in FIG. 1. This results in an exchange of the crossing angle. Such a bearing is particularly appropriate for high axial and moment loads. The bevel 18, described further above, may be omitted.

Since the length of each roll body 14a, 14b is less than its diameter, the roll bodies 14a, 14b can be put into the bearing with the supporting rings 10, 11 displaced excentrically and with the axis of rotation of the roll bodies 14a, 14b aligned radially to the bearing, provided that the concentric annular gap is at least slightly larger than half the length of the roll bodies 14a, 14b.

What is claimed is:

1. A roller bearing assembly comprising two concentric supporting rings having mutually facing circumferential surfaces, V-shaped grooves having opposed groove faces in said mutually facing circumferential surfaces, cylindrical rollers disposed in said grooves with successive rollers being offset from one another by an angle of from about 100 to 130 degrees, each of said cylindrical rollers having longitudinal end portions formed as partial conical guide surfaces which taper from the outer cylindrical surface of the roller toward the axis of the roller, said guide surface being in rolling engagement with one of the respective groove faces of the V-shaped groove such that roller bearing support is provided between said guide surface and the engaged groove face during operation of the roller bearing assembly.

2. A roller bearing assembly according to claim 1 wherein the included angle between said guide surface and the outer cylindrical surface of the roller is substantially equal to the included angle between the opposed groove faces of the V-shaped groove.

3. A roller bearing assembly according to claim 1 further comprising a retainer means disposed about said rollers for preventing said rollers from twisting.

4. A roller bearing assembly according to claim 3 wherein said retainer means is formed as one piece.

5. A roler bearing assembly according to claim 3 wherein said retainer means comprises a plurality of segments.

6. A roller bearing assembly according to claim 3 wherein said retainer means has a comb-like configuration.

7. A roller bearing assembly according to claim 1 wherein at least one of said supporting rings is formed in two parts.

8. A roller bearing assembly according to claim 1 wherein one of said supporing rings has a removable part to provide for introducing and assembling said rollers on the roller bearing assembly.

9. A roller bearing assembly according to claim 1 further comprising an annular gap between said supporting rings which is larger than the longitudinal length of said roller.

10. A roller bearing assembly comprising two concentric supporting rings having mutually facing circumferential surfaces, V-shaped grooves in said mutually facing circumferential surfaces, V-shaped inserts having opposed groove faces disposed in said V-shaped grooves, cylindrical rollers disposed in said V-shaped inserts with successive rollers being offset from one another by an angle of from about 100 to 130 degrees, each of said cylindrical rollers having longitudinal end portions formed as partial conical guide surfaces which taper from the outer cylindrical surface of the roller toward the axis of the roller, said guide surface being in rolling engagement with one of the respective groove faces of the V-shaped insert such that roller bearing support is provided between said guide surface and the engaged groove face during operation of the roller bearing assembly.

11. A roller bearing assembly according to claim 10 wherein said inserts are made of hardened steel.

12. A roller bearing assembly according to claim 10 wherein said V-shaped grooves have an included angle substantially equal to the included angle of said V-shaped inserts.

13. A roller bearing assembly according to claim 10 wherein said V-shaped grooves have an included angle greater than the included angle of said V-shaped inserts.

14. A roller bearing assembly according to claim 13 wherein at least portions of the outer surfaces of said V-shaped inserts are spaced from the surfaces defining said V-shaped groove.

15. A roller bearing assembly according to claim 14 wherein said inserts are slightly elastically deformed in their assembled position in said V-shaped grooves.

16. A cross roller bearing assembly comprising two concentric supporting rings having mutually facing circumferential surfaces, V-shaped grooves having opposed groove faces in said mutually facing circumferential surfaces, cylindrical rollers disposed in said grooves with successive rollers being offset from one another by an angle of from about 100 to 130 degrees, each of said cylindrical rollers having longitudinal end portions formed as partial toroidal guide surfaces which extend from the outer cylindrical surface of the roller to the longitudinal end face of the roller, said guide surface being in rolling engagement with one of the respective groove faces of the V-shaped groove such that roller bearing support is provided between said guide surface and the engaged groove face during operation of the roller bearing assembly.

* * * * *